United States Patent
Hori et al.

(10) Patent No.: US 6,916,575 B2
(45) Date of Patent: Jul. 12, 2005

(54) POLYMER ELECTROLYTE TYPE FUEL CELL

(75) Inventors: Yoshihiro Hori, Ikoma (JP); Masato Hosaka, Osaka (JP); Junji Nikura, Hirakata (JP); Kazuhito Hatoh, Osaka (JP); Teruhisa Kanbara, Toyonaka (JP); Takeshi Yonamine, Suita (JP); Hiroaki Matsuoka, Kanonji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 277 days.

(21) Appl. No.: 10/296,895

(22) PCT Filed: Mar. 6, 2002

(86) PCT No.: PCT/JP02/02089

§ 371 (c)(1),
(2), (4) Date: Nov. 27, 2002

(87) PCT Pub. No.: WO02/073723

PCT Pub. Date: Sep. 19, 2002

(65) Prior Publication Data

US 2003/0134180 A1 Jul. 17, 2003

(30) Foreign Application Priority Data

| Mar. 8, 2001 | (JP) | ............ 2001-065669 |
| Mar. 23, 2001 | (JP) | ............ 2001-084767 |
| Mar. 23, 2001 | (JP) | ............ 2001-084769 |

(51) Int. Cl.[7] .................... H01M 4/90; H01M 8/10
(52) U.S. Cl. .................... 429/42; 429/44; 429/30
(58) Field of Search .................... 429/42, 44, 30, 429/38

(56) References Cited

U.S. PATENT DOCUMENTS 5,211,984 A 5/1993 Wilson .................... 427/115

6,746,793 B1 6/2004 Gyoten et al.

FOREIGN PATENT DOCUMENTS

| EP | 0 687 023 A1 | 12/1995 |
| EP | 1 045 467 A1 | 10/2000 |
| JP | 61-295387 A | 12/1986 |
| JP | 61-295388 A | 12/1986 |
| JP | 64-062489 A | 3/1989 |
| JP | 03-184266 A | 8/1991 |
| JP | 03-295172 A | 12/1991 |
| JP | 05-036418 A | 2/1993 |
| JP | 06-196171 A | 7/1994 |
| JP | 07-085874 A | 3/1995 |
| JP | 07-134992 A | 5/1995 |
| JP | 07-169471 A | 7/1995 |
| JP | 08-088007 A | 4/1996 |
| JP | 2000-311694 A | 11/2000 |
| WO | WO 99/66578 A1 | 12/1999 |

*Primary Examiner*—Patrick Joseph Ryan
*Assistant Examiner*—Thomas H. Parsons
(74) *Attorney, Agent, or Firm*—Akin Gump Strauss Hauer & Feld, LLP (57) ABSTRACT

In a polymer electrolyte fuel cell of the present invention, at least one of electrodes comprises conductive carbon carrying a platinum group metal catalyst, conductive carbon carrying no catalyst metal and a hydrogen ion-conductive polymer electrolyte. The preferable amount of the conductive carbon carrying no catalyst metal is equivalent to 5 to 50 wt % of the conductive carbon carrying the catalyst metal. Incorporation of the conductive carbon carrying no catalyst metal to the catalyst layer enables reduction in potential concentration on part of electron conduction channels in an electrode, whereby an electrode for a polymer electrolyte fuel cell having an excellent life characteristic can be provided.

15 Claims, 6 Drawing Sheets

POLYMER ELECTROLYTE TYPE FUEL CELL

TECHNICAL FIELD

The present invention relates to a polymer electrolyte fuel cell, and particularly relates to improvement of a catalyst layer of an electrode as the component thereof.

BACKGROUND ART

Generally, in an electrode of a polymer electrolyte fuel cell, a pore as a supply channel of a reaction gas, a hydrogen ion-conductive polymer electrolyte and a conductive carbon material as an electron conductor form a so-called three-phase interface whose area size exerts an influence on discharge performance of the cell. In order to increase the three-phase interface and to reduce the used amount of noble metal as a catalyst material, attempts have been conventionally made to mix and disperse the hydrogen ion-conductive polymer electrolyte in the catalyst material. For example, a method has been proposed which comprises applying a mixture of a dispersion of a polymer electrolyte and a catalyst material onto a polymer electrolyte membrane and putting the resultant matter and an electrode material together to be hot pressed, and then the catalyst material is reduced (Japanese Examined Patent Publication No. Sho 62-61118 and Japanese Examined Patent Publication No. Sho 62-61119).

Moreover, a method has been proposed in which, after molding of a porous electrode, a dispersion of an ion exchange resin is dispersed over the electrode and then the electrode and the ion exchange resin are hot pressed (Japanese Examined patent Publication No. Hei 2-48632). Further proposed have been: a method in which a resin powder coated with a polymer electrolyte is mixed in an electrode (Japanese Laid-Open Patent Publication No. Hei 3-184266); a method in which a powder of a polymer electrolyte is mixed in an electrode (Japanese Laid-Open Patent Publication No. Hei 3-295172); and a method in which a polymer electrolyte, a catalyst, a carbon powder and a fluorocarbon resin are mixed to form a film so as to serve as an electrode (Japanese Laid-Open Patent Publication Hei 5-36418). U.S. Pat. No. 5,211,984 proposes a method which comprises preparing an ink-like dispersion comprising a polymer electrolyte, a catalyst and a carbon powder with the use of glycerine or tetrabutyl ammonium salt as a solvent, molding the dispersion on a film of polytetrafluoroethylene (hereinafter referred to as PTFE), and then transferring it onto the surface of a polymer electrolyte membrane. This patent further reports a method which comprises substituting the exchange group of the polymer electrolyte membrane with that of a Na type, and applying the aforesaid ink-like dispersion onto the surface of the membrane, followed by heating and drying at 125° C. or higher, to substitute the exchange group again with that of an H type.

A hydrogen ion-conductive polymer is dispersed in the catalyst layer of the polymer electrolyte fuel cell for the purpose of increasing the three-phase interface, as thus described. However, introduction of the hydrogen ion-conductive polymer, namely an increase in insulating material, inhibits electric conductivity. In connection with this, potentials are concentrated on part of an electron conducting channel, causing the hydrogen ion-conductive polymer present in the vicinity of the electron conducting channel to deteriorate. In other words, it is considered that the life characteristic of the polymer electrolyte fuel cell depends on the deterioration in hydrogen ion-conductive polymer due to the potential concentration, and thus the voltage characteristic of the cell deteriorates.

On the other hand, in the electrodes of the fuel cell, an excess fuel gas and oxidant gas which were not consumed in reactions have a role to carry water, permeating from the catalyst layer to a gas diffusion layer, to the outside of the cell. Water present in the fuel cell is important for enhancing conductivity of the polymer electrolyte membrane serving to conduct hydrogen ions and of the hydrogen ion-conductive polymer electrolyte in the catalyst layer. When this water is removed by the excess fuel gas and oxidant gas to the outside of the fuel cell during the operation thereof, the internal resistance of the cell increases and the performance thereof deteriorates.

In order to solve this problem, normally, the fuel gas and the oxidant gas to be introduced to the anode and the cathode are humidified. With the aim of downscaling a humidifying apparatus, however, the humidified amounts of the fuel gas and oxidant gas to be supplied to the fuel cell are small. When the fuel cell is operated for a long time in such a low-humidified state, the amount of the water to be removed by the excess fuel gas and oxidant gas to the outside of the cell increases, causing deterioration in cell performance with the passage of time.

For solving this problem, an attempt has been made to dispose a water-repellent layer between the catalyst layer and the gas diffusion layer of the electrode so as to suppress movement of water to the gas diffusion layer; however, sufficient effects have not yet been obtained.

It is also an object of the present invention to provide a means to suppress the deterioration in cell performance which appears as a problem when the fuel cell is operated in a low-humidified state for a long time.

DISCLOSURE OF INVENTION

The present invention provides a polymer electrolyte fuel cell where at least a catalyst layer of one of electrodes comprises a conductive carbon carrying a catalyst metal, conductive carbon carrying no catalyst metal and a hydrogen ion-conductive polymer electrolyte. That is, the present invention provides a polymer electrolyte fuel cell having an excellent life characteristic by further adding the conductive carbon carrying no catalyst to a conventional catalyst layer so as to reduce a concentration of potentials.

Herein, the preferable amount of the conductive carbon carrying no catalyst metal is equivalent to 5 to 50 wt % of the conductive carbon carrying the catalyst metal.

BEST MODE FOR CARRYING OUT THE INVENTION

As thus described, a polymer electrolyte fuel cell of the present invention comprises: a hydrogen ion-conductive polymer electrolyte membrane; a pair of electrodes sandwiching the electrolyte membrane therebetween; and a pair of separator plates which respectively have a gas flow channel for supplying a fuel gas to one of the electrodes and a gas flow channel for supplying an oxidant gas to the other of the electrodes, wherein a catalyst layer of at least one of the electrodes comprises conductive carbon carrying a platinum group metal catalyst, conductive carbon carrying no catalyst metal, and a hydrogen ion-conductive polymer electrolyte.

In a first preferable embodiment of the present invention, the catalyst layer is constituted of a mixture in which the conductive carbon carrying the catalyst metal, the hydrogen ion-conductive polymer electrolyte and the conductive carbon carrying no catalyst metal are substantially homogeneously dispersed. In this embodiment, the preferable amount of the conductive carbon carrying no catalyst metal is equivalent to 10 to 20 wt % of the conductive carbon carrying the catalyst metal.

In a second preferable embodiment of the present invention, the catalyst layer comprises two layers: a layer which is composed of the conductive carbon carrying the catalyst metal and the hydrogen ion-conductive polymer electrolyte, and in contact with the polymer electrolyte membrane; and a layer which is composed of the conductive carbon carrying no catalyst metal and the hydrogen ion-conductive polymer electrolyte. In this embodiment, the preferable amount of the conductive carbon carrying no catalyst metal is equivalent to 20 to 30 wt % of the conductive carbon carrying the catalyst metal.

In either of the above two embodiments, it is preferable that each of the electrodes has the above-mentioned catalyst layer.

In still another preferable embodiment, the specific surface area of the conductive carbon carrying no catalyst metal in the catalyst layer is equal to or less than that of the conductive carbon carrying the catalyst metal.

In another aspect, the present invention provides a polymer electrolyte fuel cell comprising: a hydrogen ion-conductive polymer electrolyte membrane, a pair of electrodes sandwiching the electrolyte membrane therebetween and a pair of separator plates which respectively have a gas flow channel for supplying and discharging a fuel gas to and from one of the electrodes and a gas flow channel for supplying and discharging an oxidant gas to and from the other of the electrodes, wherein at least one of the electrodes comprises: a catalyst layer which includes conductive carbon carrying a platinum group metal catalyst and a hydrogen ion-conductive polymer electrolyte; and a water retention layer which includes conductive carbon carrying no catalyst metal and a hydrogen ion-conductive polymer electrolyte and is in contact with the catalyst layer.

This fuel cell corresponds to the one in the second embodiment in which one layer containing no catalyst, out of the two layers constituting the catalyst layer, is the water retention layer.

In another preferable embodiment, a water-repellent layer is disposed outside the water retention layer.

In still another preferable embodiment, the water retention layer further includes a water-absorbent substance.

In the following, embodiments of a polymer electrolyte fuel cell of the present invention will be described by reference to drawings. The structural drawings used here are for facilitation of understanding, and hence relative sizes and positional relations of each of the components are not necessarily precise.

Figure 1:
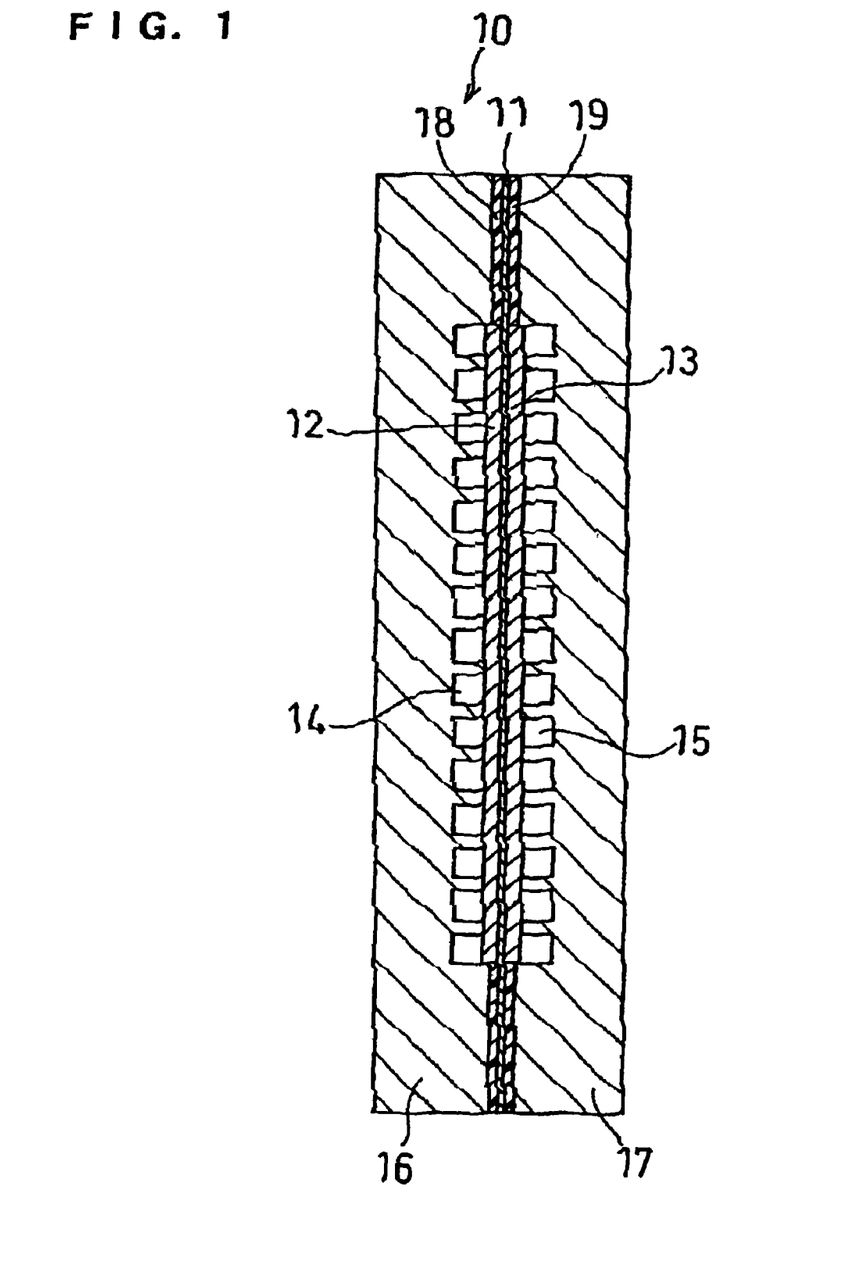
FIG. 1 is a vertical sectional view of a unit cell in an example of the present invention.

FIG. 1 shows a unit cell of a polymer electrolyte fuel cell in accordance with the present invention. A unit cell 10 is constituted of: an electrolyte membrane-electrode assembly (hereinafter referred to as an MEA) comprising a polymer electrolyte membrane 11 and a pair of electrodes 12 and 13 sandwiching the electrolyte membrane 11 therebetween; and separator plates 16 and 17 respectively having gas flow channels 14 and 15 for supplying and discharging a fuel cell and an oxidant gas to and from the electrodes 12 and 13. Gaskets 18 and 19 are inserted between the periphery of the electrolyte membrane 11 and the separator plates 16 and 17, respectively.

Figure 2:
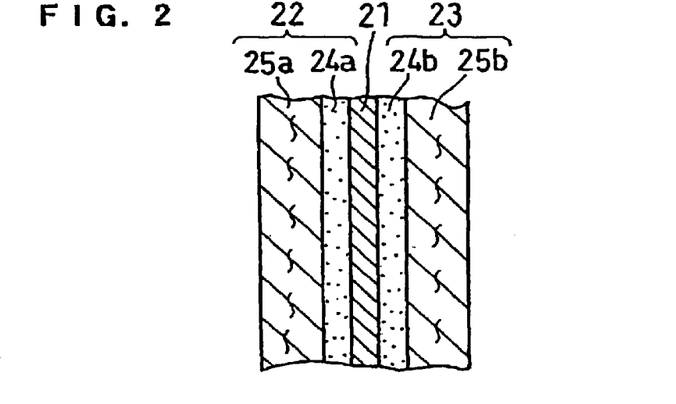
FIG. 2 is a sectional view of a main part of an MEA in an example.

FIG. 2 is a sectional view of a main part of an MEA in a first embodiment. An electrolyte membrane 21 is sandwiched between a pair of electrodes 22 and 23. The electrode 22 comprises a catalyst layer 24a and a gas diffusion layer 25a; the electrode 23 comprises a catalyst layer 24b and a gas diffusion layer 25b.

In the first embodiment, the catalyst layers 24a and 24b are each constituted of a mixture in which conductive carbon carrying a platinum group metal, conductive carbon carrying no catalyst and a polymer electrolyte are substantially homogeneously dispersed.

Figure 3:
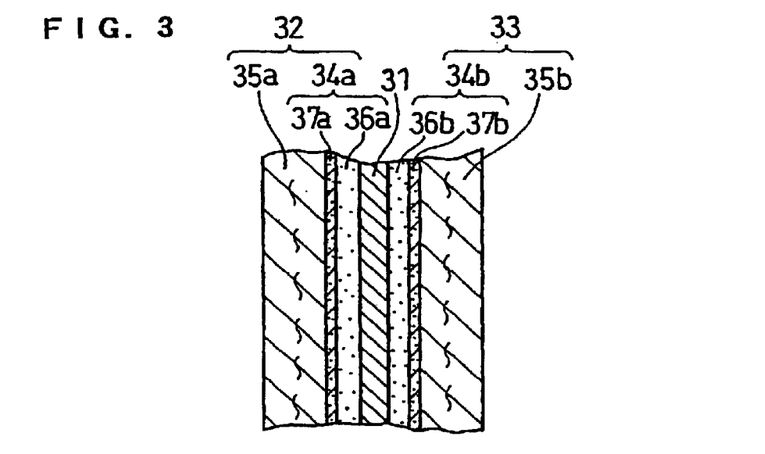
FIG. 3 is a sectional view of a main part of an MEA in another example.

FIG. 3 is a sectional view of a main part of an MEA in a second embodiment. An electrolyte membrane 31 is sandwiched between a pair of electrodes 32 and 33. The electrode 32 comprises a catalyst layer 34a and a gas diffusion layer 35a; the electrode 33 comprises a catalyst layer 34b and a gas diffusion layer 35b. The catalyst layer 34a comprises two layers: a layer 36a comprising conductive carbon carrying a platinum group metal and a polymer electrolyte; and a layer 37a comprising conductive carbon carrying no catalyst and a polymer electrolyte. Further, the catalyst layer 34b comprises: a layer 36b comprising conductive carbon carrying a platinum group metal and a polymer electrolyte; and a layer 37b comprising conductive carbon carrying no catalyst and a polymer electrolyte.

Although the examples in which the conductive carbon carrying no catalyst metal is added to the catalyst layers of the anode and the cathode are shown in FIG. 2 and FIG. 3, the conductive carbon carrying no catalyst metal may be added to the catalyst layer of only one of the electrodes.

According to the present invention, therefore, an electrode for a polymer electrolyte fuel cell having an excellent life characteristic can be provided by adding the conductive carbon carrying no catalyst metal to the catalyst layer to optimize the amount introduced and the structure thereof so that a potential concentration is reduced.

Figure 4:
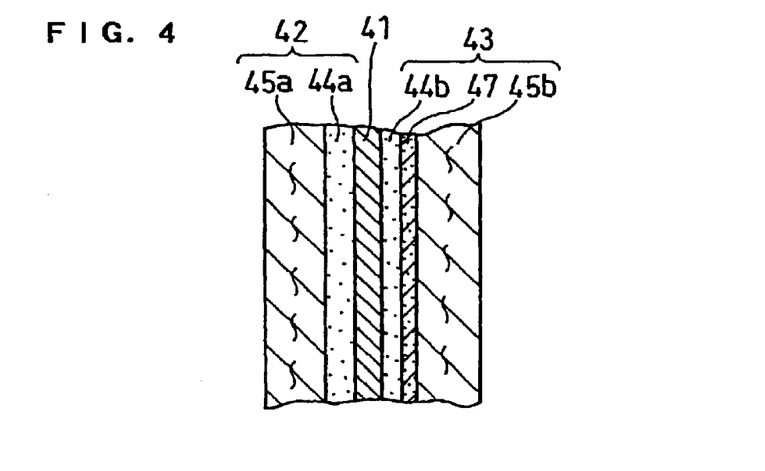
FIG. 4 is a sectional view of a main part of an MEA in still another example.

FIG. 4 is a sectional view of a main part of an MEA in a third embodiment. An electrolyte membrane 41 is sandwiched between a pair of electrodes 42 and 43. The electrode 42 comprises: a catalyst layer 44a comprising conductive carbon carrying a platinum group metal and a polymer electrolyte; and a gas diffusion layer 45a. The other electrode 43 comprises: a catalyst layer 44b comprising conductive carbon carrying a platinum group metal and a polymer electrolyte; a water retention layer 47 comprising conductive carbon carrying no catalyst and a polymer electrolyte; and a gas diffusion layer 45b.

Hydrogen ion conduction in the polymer electrolyte fuel cell occurs due to dissociation of a hydrogen ion positioned at the tip of a sulfone group bonded in pendant form to a polymer skeleton represented by the following formula, at the time of water containment in the polymer electrolyte membrane and the hydrogen ion-conductive polymer electrolyte:

where m=2, n=1, x=5 to 14, and y≈1,000.

For water contained in the electrolytes, water produced through the following reaction on the cathode side of the fuel cell:

$$1/2O_2 + 2H^+ + 2e^- \rightarrow H_2O$$

as well as a humidified gas supplied from the outside to both the anode and the cathode are utilized.

One kind of water to move inside the fuel cell is water to move from the anode side to the cathode side. This is proton-entrained water: water in a humidified gas diffuses from the gas diffusion layer to the catalyst layer and therefrom moves to the cathode side together with protons also moving to the cathode side via the hydrogen ion-conductive polymer electrolyte and the polymer electrolyte membrane.

Further, there is another kind of water that moves from the cathode side to the anode side. This is back-diffusion water that is produced for eliminating a water concentration gradient caused by the water to move from the anode side to the cathode side and water produced on the cathode side. The other kind of water than the aforesaid two kinds of water is water to be discharged from the catalyst layers to the outside of the cell by an excess fuel gas and excess air in the anode and the cathode. Among those three kinds of water, most influential to a decrease in hydrogen ion-conductivity is the last one to be discharged to the outside of the cell by the excess fuel gas and excess air. In the case of operating the cell under a low-humidified condition where the cell is humidified in a small amount from the outside, the amount of the water to be supplied to the inside of the cell relatively decreases in comparison with the case of operating the cell under a highly-humidified condition. Meanwhile, the amount of the water to be discharged to the outside of the cell increases. As a result, water necessary for maintaining the hydrogen ion-conductivity inside the cell is gradually removed to the outside of the cell.

Accordingly, a water retention layer including an absorbent water retention material and a conductive material is disposed between the catalyst layer and the gas diffusion layer of the electrode. This water retention layer serves to retain water while maintaining electric conductivity. That is, the water retention layer suppresses the amount of the water to be discharged from the catalyst layer to the outside of the cell through the gas diffusion layer.

The water retention material constituting the water retention layer has absorbing property, and is preferably a hydrogen ion-conductive polymer, a polymer or an inorganic substance having water absorbing property. In particular, the hydrogen ion-conductive polymer is preferable from the aspect of electrochemical stability. Further, the polymer having water absorbing property is preferable from the aspect of water content. The inorganic substance having water absorbing property is preferable from the aspect of thermal stability.

As the conductive material used is one having electric conductivity, and the preferable one is conductive carbon or a conductive polymer. The conductive carbon is particularly preferable from the aspect of thermal stability.

With the water retention layer disposed, the water removed from the catalyst layer of the electrode by the excess gas can be trapped again in the water retention layer due to bonding force between the water retention material and water even when the cell is operated in the low-humidified state for a long time. It is thereby possible to reduce the amount of the water to be removed from the inside to the outside of the cell. Further, the water retention layer becomes more effective when a water repellent layer exists on the water retention layer side of the gas diffusion layer since the water repellent layer suppresses movement of the water to the gas diffusion layer.

As for electric conductivity in the water retention layer, on the other hand, there is no obvious increase in resistance value in comparison with the case where no water retention layer exists because the conductive material is mixed in the water retention layer. Therefore, the existence of the water retention layer does not cause a large decrease in cell performance.

As thus described, it is possible to suppress the deterioration in cell performance by suppressing the decrease in hydrogen ion-conductivity even when the fuel cell is operated under the low-humidified condition for a long period of time.

There are some cases where, in a polymer electrolyte fuel cell, hydrogen supplied from methane, natural gas or the like through a reformer is used as a fuel gas. This kind of reformed gas contains carbon monoxide, carbon dioxide and the like which were produced together with hydrogen. When such a reformed gas is supplied to the anode, carbon dioxide is reduced to carbon monoxide by the catalyst of the anode. This carbon monoxide poisons the catalyst of the electrode. The degree of poisoning of the catalyst is larger in the downstream of the supply gas flow channel than in the upstream thereof. On the other hand, the gas to be supplied is humidified for the purpose of securing hydrogen ion-conductivity of the hydrogen ion-conductive polymer electrolyte membrane and the hydrogen ion-conductive polymer electrolyte in the catalyst layer, as described above. However, in the upstream and the downstream of the flow channel of the gas to be supplied, the degrees of humidification of the gas differ in accordance with the amounts of the gas consumed. In other words, it is anticipated that the upstream of the gas flow channel is humidified in a small amount while the downstream thereof is highly humidified.

For these reasons, there are some cases where a cell voltage supposed to be obtained may not be sufficiently outputted.

The present invention provides a polymer electrolyte fuel cell capable of solving such a problem. Namely, in a catalyst layer of an electrode, the content of a catalyst in the downstream side of a gas flow channel is made larger than that in the upstream side thereof. According to this embodiment, in the anode, the content of the catalyst is larger in the downstream of the gas flow channel and the degree of poisoning with carbon monoxide can thus be reduced. Further, in a cathode, the content of the catalyst is larger in the downstream and a decrease in catalyst capacity due to high humidification can thus be reduced.

Figure 5:
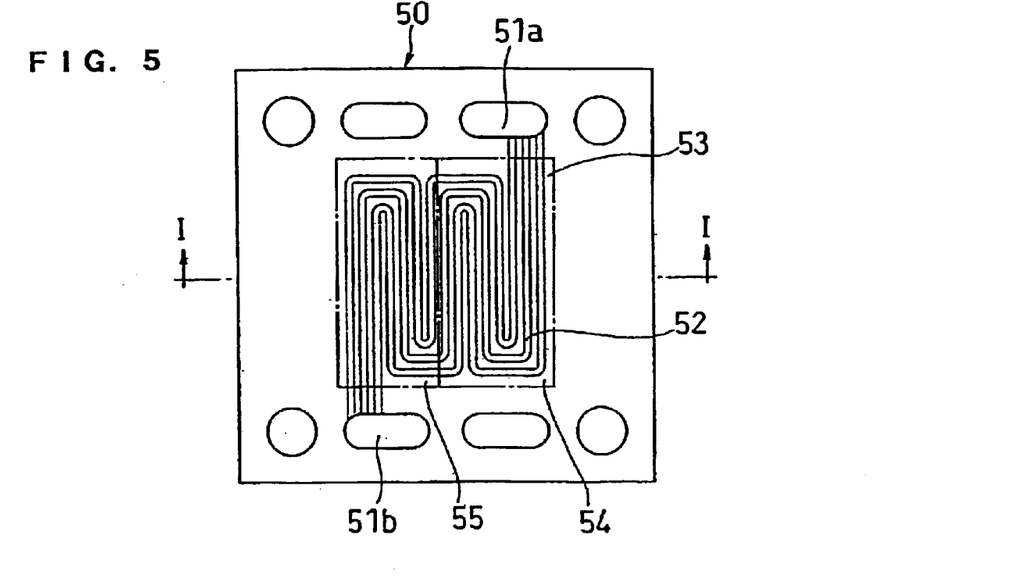
FIG. 5 is a front view of an anode-side conductive separator plate.
Figure 6:
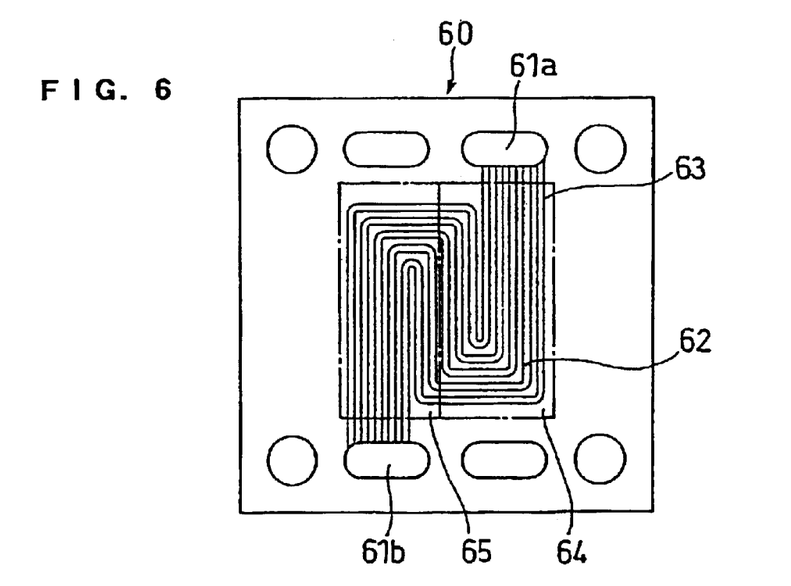
FIG. 6 is a front view of a cathode-side conductive separator plate.

FIG. 5 and FIG. 6 are front views of an anode-side separator plate 50 and a cathode-side separator plate 60, respectively. The anode-side separator plate 50 has: an inlet-side manifold aperture 51a and an outlet side manifold aperture 51b for fuel gas; and a gas flow channel 52 comprising three parallel grooves, which communicate the one manifold aperture to the other, on the surface facing the anode of an MEA. In FIG. 5, a part 53 where the separator plate 50 is in contact with the anode of the MEA is shown as surrounded with a dash-dotted line. In FIG. 5, a part 54 is the upstream part of the gas flow channel and a part 55 is the downstream part thereof. The respective catalyst layers in the parts of the anode corresponding to the upstream side and the downstream side are made different in structure.

In the same manner as above, the cathode-side separator plate 60 has: an inlet-side manifold aperture 61a and an outlet-side manifold aperture 61b for oxidant gas; and a gas flow channel 62 comprising five parallel grooves, which communicate one manifold aperture to the other, on the surface facing the cathode of the MEA. In FIG. 6, a part 63 where the separator plate 60 is in contact with the cathode of the MEA is shown as surrounded with a dash-dotted line. In FIG. 6, a part 64 is the upstream part of the gas flow channel and a part 65 is the downstream part thereof; the respective catalyst layers in the parts of the cathode corresponding to the upstream side and the downstream side are made different in structure.

FIG. 1 corresponds to a sectional view of the fuel cell cut along the I—I line of FIG. 5. Therefore, the gas flow channels 14 and 15 in FIG. 1 correspond to the gas flow channel 52 in FIG. 5 and the gas flow channel 62 in FIG. 6, respectively.

Below, the present invention will be described by means of examples.

EXAMPLE 1

Platinum was carried on carbon black (Ketjen black EC manufactured by LION CORPORATION) with a specific surface area of 800 m²/g in a weight ratio of 50:50. This catalyst-carrying carbon was mixed with: the same kind of carbon black as above carrying no platinum in an amount equivalent to 5 to 50 wt % of the above carbon weight; and a polymer electrolyte having the same ion exchange capacity as that of the below-mentioned hydrogen ion-conductive polymer electrolyte membrane in the same amount as the total carbon weight of the above-mentioned two kinds of carbon black. The obtained mixture was applied onto each side of a hydrogen ion-conductive polymer electrolyte membrane with an ion exchange capacity of 1,000 to 1,100 such that the amount of platinum was 0.3 mg/cm², to form a catalyst layer.

Meanwhile, a water-based ink containing polytetrafluoroethylene (hereinafter referred to as PTFE) and carbon black (Acetylene black manufactured by DENKI KAGAKU KOGYO KABUSHIKI KAISHA) in a weight ratio of 1:1 was prepared. The obtained water-based ink was applied onto carbon paper (manufactured by Toray Industries, Inc., thickness: 360 μm) and baked at 350° C. This carbon paper was bonded by hot pressing to the outside of the hydrogen ion-conductive polymer electrolyte membrane with the aforesaid catalyst layers formed thereon to obtain a membrane-electrode assembly.

A unit cell was produced using the obtained membrane-electrode assembly, and at a cell temperature of 75° C., a pure hydrogen gas humidified and heated to have a dew point of 70° C. and air humidified and heated to have a dew point of 50° C. were supplied to the anode and the cathode, respectively, to conduct a discharge test at a fuel gas utilization rate of 70% and an air utilization rate of 40%.

Figure 7:
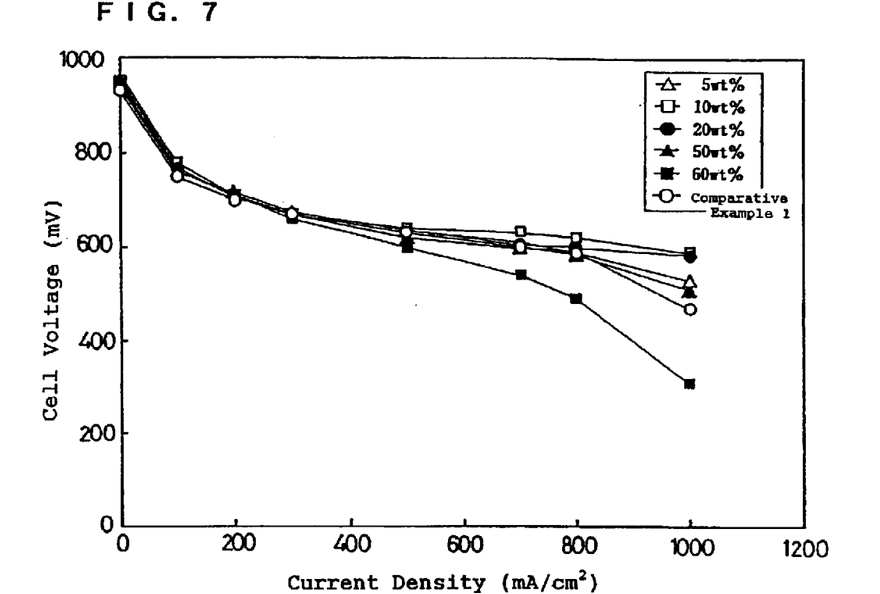
FIG. 7 is a graph comparing initial current-voltage characteristics of cells in an example.
Figure 8:
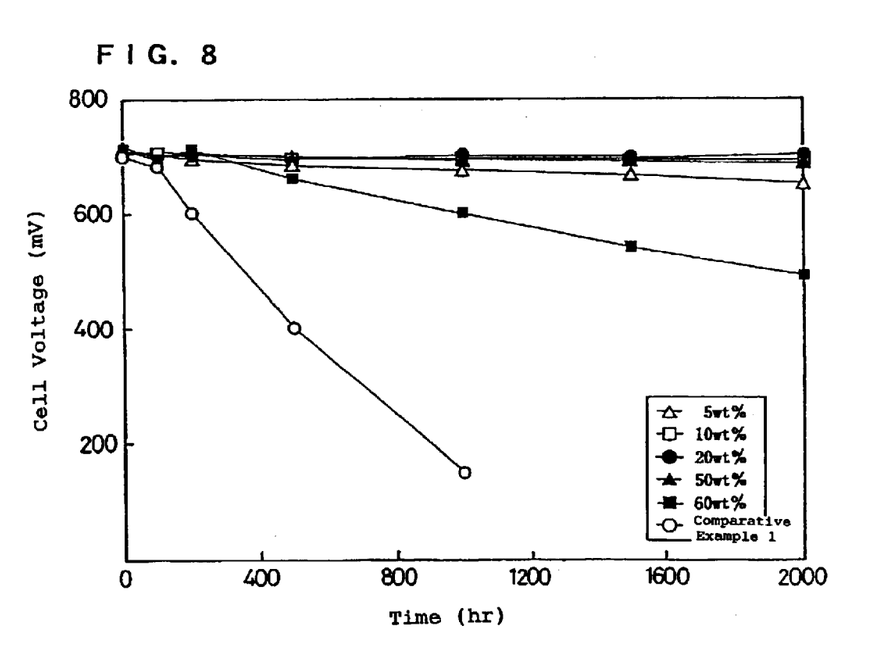
FIG. 8 is a graph indicating variation with time of cell voltages.

FIG. 7 shows the current-voltage characteristics of the cell in the initial stage at different addition rates of the carbon carrying no catalyst. FIG. 8 shows the variations with time of the cell voltage at a current density of 200 mA/cm². When the carbon black carrying no platinum was added to the catalyst layer, in the range that the addition rate of the carbon carrying no catalyst was equivalent to 5 to 50 wt % of the carbon carrying the catalyst, the initial characteristic of the cell was almost equal to that in Comparative Example 1 where a catalyst layer was added with no carbon, and in the range that the addition rate of the carbon was 10 to 20 wt %, the initial characteristic of the cell was above that in Comparative Example 1. As for a life characteristic, on the other hand, the unit cell added with the carbon black carrying no platinum had a more excellent characteristic than a unit cell added with no such carbon black in Comparative Example 1. In the range that the addition rate of the carbon was 10 to 20 wt %, the unit cell particularly had an excellent life characteristic.

EXAMPLE 2

Platinum was carried on carbon black (Ketjen black EC manufactured by LION CORPORATION) with a specific surface area of 800 m²/g in a weight ratio of 50:50. This catalyst-carrying carbon was mixed with: carbon black (VULCAN XC manufactured by CABOT CORPORATION) carrying no platinum with a specific surface area of 250 m²/g in an amount equivalent to 5 to 50 wt % of the above carbon weight; and the same hydrogen ion-conductive polymer electrolyte as in Example 1. The mixing amount of the hydrogen ion-conductive polymer electrolyte was the same weight of the carbon carrying platinum plus the amount equivalent to three-fourths of the weight of the carbon carrying no platinum. This mixture was applied onto each side of the same hydrogen ion-conductive polymer electrolyte membrane as in Example 1 to form a catalyst layer. Thereafter, in the same manner as in Example 1, a membrane-electrode assembly was produced to obtain a unit cell. A test under the same conditions as in Example 1 was then conducted.

As a result, as in Example 1, the same initial characteristic as in Comparative Example 1 was exhibited in the range that the addition rate of the carbon carrying no catalyst was equivalent to 5 to 50 wt % of the carbon carrying the catalyst. As for the life characteristic, on the other hand, an excellent characteristic was exhibited in the range of the addition rate of the carbon carrying no platinum.

EXAMPLE 3

Platinum was carried on carbon black (Ketjen black EC manufactured by LION CORPORATION) with a specific surface area of 800 m²/g in a weight ratio of 50:50. This catalyst-carrying carbon was mixed with: carbon black (Acetylene black manufactured by DENKI KAGAKU KOGYO KABUSHIKI KAISHA) carrying no platinum with a specific surface area of 70 m²/g in an amount equivalent to 5 to 50 wt % of the above carbon weight; and the same hydrogen ion-conductive polymer electrolyte as in Example 1. The mixing amount of the hydrogen ion-conductive polymer electrolyte was the same weight of the carbon carrying platinum plus the amount equivalent to one-half of the weight of the carbon carrying no platinum. This mixture was applied onto each side of the same hydrogen ion-conductive polymer electrolyte membrane as in Example 1 to form a catalyst layer. Thereafter, in the same manner as in Example 1, a membrane-electrode assembly was produced to obtain a unit cell. A test under the same conditions as in Example 1 was then conducted.

As a result, as in Example 1, the same initial characteristic as in Comparative Example 1 was exhibited in the range that the addition rate of the carbon carrying no catalyst was equivalent to 5 to 50 wt % of the carbon carrying the catalyst. As for the life characteristic, on the other hand, an excellent characteristic was exhibited in the range of the addition rate of the carbon carrying no platinum.

EXAMPLE 4

Platinum was carried on carbon black (Ketjen black EC manufactured by LION CORPORATION) with a specific surface area of 800 m²/g in a weight ratio of 50:50. This catalyst-carrying carbon was mixed with the same hydrogen ion-conductive polymer electrolyte as in Example 1 in an amount the same as the weight of the above carbon. This mixture was applied onto each side of the same hydrogen ion-conductive polymer electrolyte membrane as in Example 1 to form a catalyst layer. Subsequently, a layer of a mixture comprising carbon black carrying no platinum and a hydrogen ion-conductive polymer electrolyte in an equal weight ratio was formed on the obtained catalyst layer such that the amount of carbon used was the same as that of the catalyst layer formed in Example 1. Thereafter, in the same manner as in Example 1, a membrane-electrode assembly was produced to obtain a unit cell.

Figure 9:
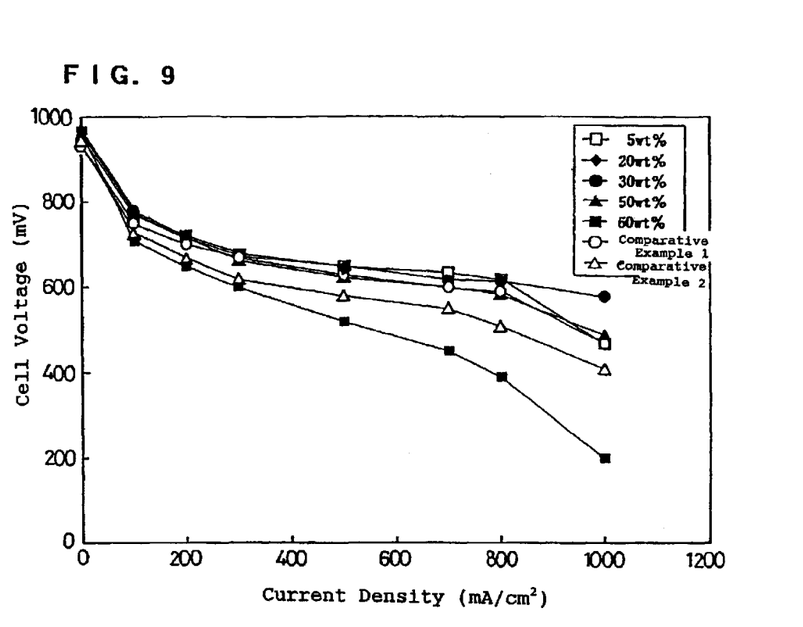
FIG. 9 is a graph comparing initial current-voltage characteristics of cells in another example.
Figure 10:
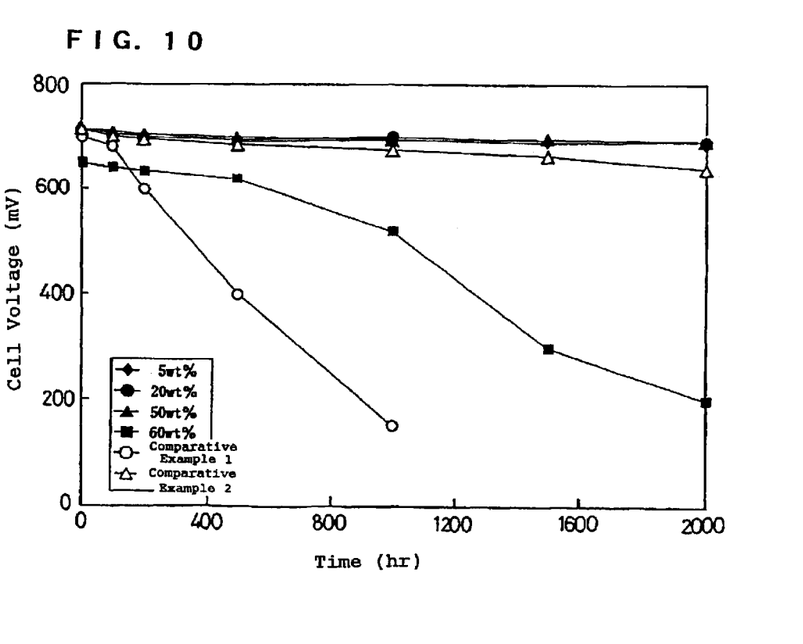
FIG. 10 is a graph indicating variation with time of cell voltages.

FIG. 9 shows the initial current-voltage characteristics of the cell under the same conditions as in Example 1, and FIG. 10 shows the life characteristics thereof.

EXAMPLE 5

Platinum was carried on carbon black (Ketjen black EC manufactured by LION CORPORATION) with a specific surface area of 800 m²/g in a weight ratio of 50:50. This catalyst-carrying carbon was mixed with the same hydrogen ion-conductive polymer electrolyte as in Example 1 in an amount the same as the weight of the above carbon. This mixture was applied onto each side of the same hydrogen ion-conductive polymer electrolyte membrane as in Example 1 to form a catalyst layer. Subsequently, a layer of a mixture comprising carbon black carrying no platinum and a hydrogen ion-conductive polymer electrolyte in an amount equivalent to one-half of this carbon black was formed on the obtained catalyst layer such that the amount of carbon used was the same as that of the catalyst layer formed in Example 3. Thereafter, in the same manner as in Example 1, a membrane-electrode assembly was produced to obtain a unit cell.

As a result, as in Example 4, a similar initial characteristic to that in Comparative Example 1 was exhibited in the range that the addition rate of the carbon carrying no catalyst was equivalent to 5 to 50 wt % of the carbon carrying the catalyst, and in particular, an excellent characteristic was exhibited in the range that the amount of the carbon carrying no platinum was 20 to 30 wt %. As for the life characteristic, on the other hand, an excellent characteristic was exhibited in the range of the addition rate of the carbon carrying no platinum.

COMPARATIVE EXAMPLE 1

Platinum was carried on carbon black (Ketjen black EC manufactured by LION CORPORATION) with a specific surface area of 800 m²/g in a weight ratio of 50:50. This catalyst-carrying carbon was mixed with the same hydrogen ion-conductive polymer electrolyte as in Example 1 in an amount the same as the weight of the above carbon. This mixture was applied onto each side of the same hydrogen ion-conductive polymer electrolyte membrane as in Example 1 to form a catalyst layer. Thereafter, in the same manner as in Example 1, a membrane-electrode assembly was produced to obtain a unit cell. FIG. 7 and FIG. 9 show the initial current-voltage characteristics and FIG. 8 and FIG. 10 show the life characteristics.

COMPARATIVE EXAMPLE 2

Carbon black (Ketjen black EC manufactured by LION CORPORATION) carrying no platinum with a specific surface area of 800 m²/g was mixed with the same hydrogen ion-conductive polymer electrolyte as in Example 1 in a weight ratio of 50:50. This mixture was applied onto each side of the same hydrogen ion-conductive polymer electrolyte membrane as in Example 1. The total amount of the carbon included in this applied layer was the same as the total amount of the carbon included in the catalyst layer formed in Example 1. Subsequently, platinum was carried on the same carbon black as above in a weight ratio of 50:50. This catalyst-carrying carbon was mixed with a hydrogen ion-conductive polymer electrolyte in an equal weight ratio, and a layer comprising the obtained mixture was formed on the applied layer. Thereafter, in the same manner as in Example 1, a membrane-electrode assembly was produced to obtain a unit cell.

FIG. 9 shows the initial current-voltage characteristics and FIG. 10 shows the life characteristics.

EXAMPLE 6

Platinum was carried on Ketjen black with a specific surface area of 800 m²/g in a weight ratio of 50:50. 16 parts by weight of this catalyst powder was mixed with 84 parts by weight of an alcohol solution containing 10 wt % of a hydrogen ion-conductive polymer electrolyte (Flemion, manufactured by Asahi Glass Co.,Ltd.), and the resultant mixture was subjected to ultrasonic stirring to prepare an ink for production of an electrode. The obtained ink was printed on each face of a hydrogen ion-conductive polymer electrolyte membrane (Nafion 112, manufactured by E.I. Du Pont de Nemours & Co. Inc.) such that the amount of carried platinum was 0.3 mg/cm², to form a catalyst layer. A membrane-catalyst layer assembly was thus produced.

Next, 12 parts by weight of an acetylene black powder was mixed with 88 parts by weight of an alcohol solution containing 10 wt % of a hydrogen ion-conductive polymer electrolyte (Flemion, manufactured by Asahi Glass Co.,Ltd), and the resultant mixture was subjected to ultrasonic stirring to prepare an ink for a water retention layer. The obtained ink was applied onto a substrate and then dried to produce a water retention layer. The amount of acetylene black contained in the water retention layer was made to be 0.6 mg/cm$^2$. This water retention layer was brought into intimate contact with one face of the obtained membrane-catalyst layer assembly and heated so as to transfer the water retention layer on the substrate onto the membrane-catalyst layer assembly.

Meanwhile, carbon non-woven fabric (TGP-H-120, manufactured by Toray Industries, Inc.) with a thickness of 360 μm was used as carbon paper to serve as a base material of an electrode. A water-based ink, containing acetylene black and polytetrafluoroethylene of a water repellent agent in an amount equivalent to 21 wt % of the acetylene black, was applied onto one face of the carbon paper, and then baked at 350° C. The membrane-catalyst layer assembly having the water retention layer was sandwiched between two sheets of the carbon paper thus subjected to water-repellent treatment, and then bonded by hot pressing. Finally, gasket plates made of butyl rubber were bonded to the periphery of the polymer electrolyte membrane, in which manifold apertures for circulations of cooling water, a fuel gas and an oxidant gas were formed. An MEA was thus produced.

Subsequently, a separator plate constituted of a resin-impregnated graphite plate having outer dimensions of 20 cm×32 cm and a thickness of 1.3 mm with a gas flow channel and a cooling water flow channel each having a depth of 0.5 mm was prepared. The MEA sheet was sandwiched between two separator plates to assemble a unit cell.

In this unit cell, the side with the water retention layer was the cathode and the side without the same was the anode. A pure hydrogen gas humidified and heated to have a dew point of 75° C. and air humidified and heated to have a dew point of 30° C. were supplied to the anode and the cathode, respectively, and at a cell temperature of 75° C., a fuel gas utilization rate of 70% and an air utilization rate of 40%, the cell characteristics were evaluated.

Figure 11:
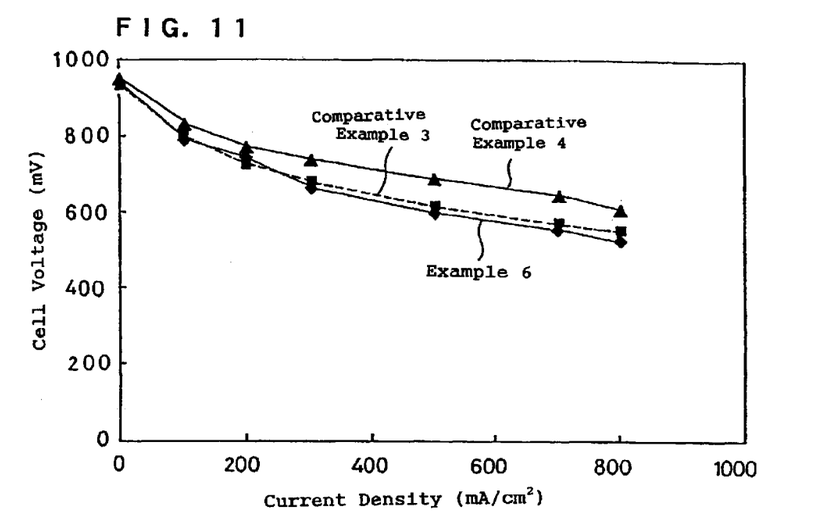
FIG. 11 is a graph comparing initial current-voltage characteristics of cells in still another example.

First, FIG. 11 shows the current-voltage characteristics. Next, a continuous power generation test was conducted at a current density of 0.2 A/cm$^2$. As a result, the initial voltage was 730 mV, and the ratio of decrease in cell voltage after the lapse of 4,000 hours was 3.5 mV/1,000 hours.

EXAMPLE 7

An MEA was obtained in the same manner as in Example 6. A unit cell was produced using this MEA. The side with the water retention layer was the anode and the side without the same was the cathode, and a discharge test was conducted under the same conditions as in Example 6. The resultant current-voltage characteristic was almost the same as that in Example 6. Subsequently, a continuous power generation test was conducted at a current density of 0.2 A/cm$^2$. As a result, the initial voltage was 731 mV and the ratio of decrease in cell voltage after the lapse of 4,000 hours was 3 mV/1,000 hours.

EXAMPLE 8

Except that a water retention layer was formed on each of the anode and the cathode, a unit cell was produced in the same manner as in Example 6 and a discharge test was conducted under the same conditions as in Example 6. The current-voltage characteristic was almost the same as that in Example 6. When a continuous power generation test was conducted at a current density of 0.2 A/cm$^2$, the result was that the initial voltage was 730 mV and the ratio of decrease in cell voltage after the lapse of 4,000 hours was 2.8 mV/1,000 hours.

EXAMPLE 9

First, a catalyst layer was formed on each face of a polymer electrolyte membrane as in Example 6 to produce a membrane-catalyst layer assembly. Next, an acetylene black powder was mixed with cellulose in a 5 wt % alcohol aqueous solution and subjected to ultrasonic stirring to prepare an ink for a water retention layer. This ink was applied onto a substrate and dried to form a water retention layer. The obtained water retention layer was brought into intimate contact with one face of the membrane-catalyst layer assembly and heated so as to transfer the water retention layer on the substrate onto the membrane-catalyst layer assembly. The amount of acetylene black in the water retention layer was 0.6 mg/cm$^2$.

The membrane-catalyst layer assembly having the water retention layer on one face thereof was sandwiched between two sheets of the carbon paper subjected to water-repellent treatment in the same manner as in Example 6, and bonded to each other by hot pressing to obtain an MEA. A unit cell was produced using this MEA. The side with the water retention layer was the cathode and the side without the same was the anode. A discharge test was conducted under the same conditions as in Example 6. The current-voltage characteristic was almost the same as that in Example 6. When a continuous power generation test was conducted at a current density of 0.2 A/cm$^2$, the result was that the initial voltage was 723 mV and the ratio of decrease in cell voltage after the lapse of 4,000 hours was 4 mV/1,000 hours.

EXAMPLE 10

The same unit cell as in Example 9 was used. However, the side with the water retention layer was the anode and the side without the same was the cathode. A continuous power generation test was conducted under the same conditions as in Example 6. As a result, at a current density of 0.2 A/cm$^2$, the initial voltage was 725 mV and the ratio of decrease in cell voltage after the lapse of 4000 hours was 3.5 mV/1,000 hours.

EXAMPLE 11

A unit cell having a water retention layer on each face thereof was obtained in the same manner as in Example 9. A continuous power generation test was conducted under the same conditions as in Example 6. As a result, at a current density of 0.2 A/cm$^2$, the initial voltage was 724 mV and the ratio of decrease in cell voltage after the lapse of 4,000 hours was 3 mV/1,000 hours.

EXAMPLE 12

A mixture of an acetylene black powder and silica was mixed in a 5 wt % alcohol aqueous solution and subjected to ultrasonic stirring to prepare an ink for a water retention layer. Except that a water retention layer was formed using this ink, a unit cell was assembled in the same manner as in Example 6. The amounts of acetylene black and silica contained in the water retention layer were 0.6 mg/cm$^2$ and 0.12 mg/cm$^2$, respectively.

The side with the water retention layer was the cathode and the side without the same was the anode, and a continuous power generation test was conducted under the same conditions as in Example 6. As a result, at a current density of 0.2 A/cm$^2$, the initial voltage was 728 mV and the ratio of decrease in cell voltage after the lapse of 4,000 hours was 4.2 mV/1,000 hours.

EXAMPLE 13

The same unit cell as in Example 12 was used. However, the side with the water retention layer was the anode and the side without the same was the cathode. A continuous power generation test was conducted under the same conditions as in Example 6. As a result, at a current density of 0.2 A/cm$^2$, the initial voltage was 726 mV and the ratio of decrease in cell voltage after the lapse of 4,000 hours was 3.7 mV/1,000 hours.

EXAMPLE 14

A unit cell having a water retention layer on each face thereof was obtained in the same manner as in Example 12. A continuous power generation test was conducted under the same conditions as in Example 6. As a result, at a current density of 0.2 A/cm$^2$, the initial voltage was 727 mV and the ratio of decrease in cell voltage after the lapse of 4,000 hours was 3.2 mV/1,000 hours.

COMPARATIVE EXAMPLE 3

Except that neither the anode side nor the cathode side has a water retention layer, a unit cell was assembled in the same manner as in Example 6. FIG. 11 shows the current-voltage characteristics of this cell under the same conditions as in Example 6. As a result of a continuous power generation test, at a current density of 0.2 A/cm$^2$, the initial voltage was 726 mV and the ratio of decrease in cell voltage after the lapse of 4,000 hours was 20 mV/1,000 hours.

COMPARATIVE EXAMPLE 4

The same unit cell as Comparative Example 3 was used. Except that a pure hydrogen gas and air were both humidified and heated to have a dew point of 75° C., a discharge test was conducted under the same conditions as in Example 6. FIG. 11 shows the current-voltage characteristics. When a continuous power generation test was conducted at a current density of 0.2 A/cm$^2$, the result was that the initial voltage was 774 mV and the ratio of decrease in cell voltage after the lapse of 4,000 hours was 10 mV/1,000 hours.

In Example 6, there was a small degradation in performance in the high current density region in comparison with Comparative Example 3 because the provision of the water retention layer on the cathode side slightly inhibits gas diffusion property on the cathode side. At a low current density, however, the effect on the gas diffusion property is negligible since just a small amount of gas is required for a reaction. As shown in FIG. 11, therefore, the current-voltage characteristics at the low current density in Example 6 and Comparative Example 3 are almost the same. On the other hand, when a continuous power generation test was conducted at a current density of 0.2 A/cm$^2$, the amount of water in the catalyst layer to be removed by an unreacted gas in Example 6 is less than that in Comparative Example 3 because of the existence of the water retention layer. For this reason, a decrease in cell voltage in a long-time continuous operation can be suppressed.

A deterioration ratio of a cell varies depending on an electrode with the water retention layer formed thereon. The water retention layer exerts the effect of improving cell performance in decreasing order of:
both electrodes>an anode>a cathode.
This is because: on the cathode side, a certain amount of water is supplied by proton-entrained water and produced water; whereas on the anode side, water tends to be deficient since a small amount of water is supplied by back-diffusion water and water is always lost to be the proton-entrained water. For this reason, the effect of the improvement is larger when the water retention layer is disposed on the anode side rather than disposed only on the cathode side, and the effect is largest when the water retention layer is disposed on each electrode.

In comparison between Example 6 and Comparative Example 4 under a highly-humidified condition, as for the current-voltage characteristic, the cell in Example 4 operates more favorably in terms of reactivity between the reaction gas and the catalyst because of a higher temperature, and thus exhibited a higher voltage value. As for a degradation ratio of the cell voltage, however, because water retention capacity is higher in Example 6 than that in Comparative Example 4 due to the existence of the water retention layer, the degradation ratio of the voltage is lower in Example 6 than that in Comparative Example 4.

EXAMPLE 15

A platinum catalyst was carried on Ketjen black (manufactured by LION CORPORATION) with a specific surface area of 800 m$^2$/g in a weight ratio of 50:50. This catalyst-carrying carbon was mixed with an ethanol dispersion of a hydrogen ion-conductive polymer electrolyte with the same ion exchange capacity as that of the hydrogen ion-conductive polymer electrolyte membrane to prepare an ink A for a catalyst layer of the cathode. The amount of the hydrogen ion-conductive polymer electrolyte contained in this ink was the same as the weight of the Ketjen black used for the catalyst. Further, a catalyst carrying the same platinum as above was dry mixed with Ketjen black carrying no platinum in an amount equivalent to 10 to 20 wt % of the carbon weight of the catalyst. This mixture was further mixed with the same ethanol dispersion of the hydrogen ion-conductive polymer electrolyte as above to prepare an ink B for a catalyst layer of the cathode. The amount of the hydrogen ion-conductive polymer electrolyte contained in this ink was the same as the weight of the Ketjen black used for the catalyst.

These catalyst inks A and B were each applied on a PTFE substrate by screen-printing, followed by drying, to form a catalyst layer A and a catalyst layer B. The catalyst layers A and B were thermally transferred onto one face of a polymer electrolyte membrane having an ion exchange capacity of 1,000 to 1,100. Herein, the catalyst layer B was transferred onto the upstream part of an oxidant gas flow channel, or the part corresponding to numeral 64 in FIG. 6, and the catalyst layer A was transferred onto the downstream part of the gas flow channel, or the part corresponding to numeral 65 in FIG. 6.

Next, a catalyst layer on the anode side will be described. A Pt—Ru catalyst was carried on Ketjen black with a specific surface area of 800 m$^2$/g in a weight ratio of 60:40. This catalyst-carrying carbon was mixed with the same ethanol dispersion of a hydrogen ion-conductive polymer electrolyte as above to prepare an ink C. The amount of the hydrogen ion-conductive polymer electrolyte contained in the ink C was 1.2 times the amount of the Ketjen black used for the catalyst. This ink C was applied onto a PTFE substrate by screen-printing, followed by drying, to form a catalyst layer C. The obtained catalyst layer C was thermally transferred onto the whole area of the anode side of the polymer electrolyte membrane with the cathode-side catalyst layer formed thereon.

Meanwhile, a water-based ink containing Acetylene black (manufactured by DENKI KAGAKU KOGYO KABUSHIKI KAISHA) and PTFE in an amount equivalent to 23 wt % of the Acetylene black was prepared. The obtained ink was applied by spraying onto one face of carbon paper (manufactured by Toray Industries, Inc., thickness: 360 µm) and baked at 300° C. The polymer electrolyte membrane with the catalyst layers formed thereon was sandwiched between two sheets of the carbon paper thus subjected to water repellent treatment with the water-repellent faces thereof inwardly opposed, and the whole was then bonded by hot pressing to obtain a membrane-electrode assembly. This membrane-electrode assembly was combined with an anode-side separator plate and a cathode-side separator plate respectively having the structure shown in FIG. 5 and FIG. 6, to assemble a unit cell.

Figure 12:
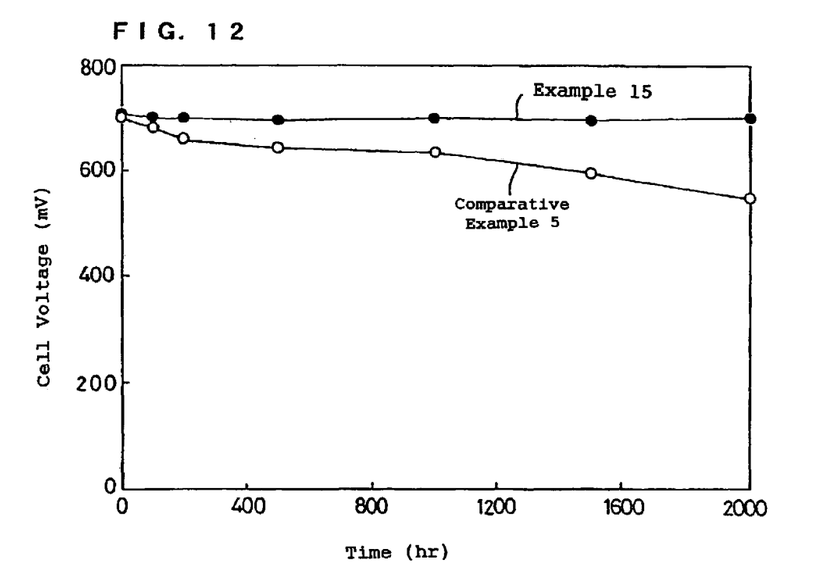
FIG. 12 is a graph indicating variation with time of cell voltages in another example.

This fuel cell was kept at 75° C., and a hydrogen gas containing 50 ppm of carbon monoxide humidified and heated to have a dew point of 70° C. was supplied to the anode and air humidified and heated to have a dew point of 70° C. was supplied to the cathode. A life test was conducted at a fuel gas utilization rate of 70% and an air utilization rate of 40%. FIG. 12 shows the variations with time of the cell voltage at that time.

EXAMPLE 16

The whole area of a catalyst layer of a cathode was made from the catalyst layer A in Example 15.

The upstream part of a gas flow channel in a catalyst layer on the anode side was made from a catalyst layer D below; the downstream part of the same was made from a catalyst layer E below. Catalyst layers D and E were made, in the same manner as in Example 15, from an ink obtained by mixing a Pt—Ru catalyst, carried on Ketjen black in a weight ratio of 60:40, with an ethanol dispersion of a hydrogen ion-conductive polymer electrolyte. However, the respective amounts of the hydrogen ion-conductive polymer electrolytes contained in the inks D and E were 1.0 time and 1.4 times the weight of Ketjen black used for each catalyst.

A life test was conducted on a unit cell assembled in the same manner as in Example 15, and almost the same characteristic as in Example 15 was exhibited.

EXAMPLE 17

The whole area of a catalyst layer of an anode was made from the catalyst layer C in Example 15.

The upstream part of a gas flow channel in a catalyst layer on the cathode side was made from a catalyst layer F below; the downstream part thereof was made from a catalyst layer G below. Catalyst layers F and G were made, in the same manner as in Example 15, from an ink obtained by mixing a Pt catalyst, carried on Ketjen black in a weight ratio of 50:50, with an ethanol dispersion of a hydrogen ion-conductive polymer electrolyte. However, the respective amounts of the hydrogen ion-conductive polymer electrolytes contained in the inks F and G were 1.2 times and 0.8 time the weight of Ketjen black used for each catalyst.

A life test was conducted on a unit cell assembled in the same manner as in Example 15, and almost the same characteristic as in Example 15 was exhibited.

COMPARATIVE EXAMPLE 5

The whole area of a catalyst layer on the cathode side was made from the catalyst layer A in Example 15. The whole area of a catalyst layer on the anode side was made from the catalyst layer C in Example 15.

A life test was conducted on a unit cell of Comparative Example 5 under the same conditions as in Example 15. The results are shown in FIG. 12.

INDUSTRIAL APPLICABILITY

As thus described, according to the present invention, an electrode for a polymer electrolyte fuel cell having an excellent life characteristic can be provided by adding conductive carbon carrying no catalyst metal to a catalyst layer and thus by optimizing the amount introduced and the structure thereof to reduce a potential concentration. Further, a fuel cell, in which a decrease in hydrogen ion-conductivity and a subsequent deterioration in cell performance are suppressed even when the cell is operated under a low-humidified condition for a long time, can be provided by utilizing a layer including the conductive carbon carrying no catalyst metal as a water retention layer.

What is claimed is:

1. A polymer electrolyte fuel cell comprising: a hydrogen ion-conductive polymer electrolyte membrane; a pair of electrodes sandwiching said electrolyte membrane therebetween; and a pair of separator plates which respectively have a gas flow channel for supplying and discharging a fuel gas to and from one of said electrodes and a gas flow channel for supplying and discharging an oxidant gas to and from the other of said electrodes, wherein each of said electrodes comprises a catalyst later in contact with said electrolyte membrane and a gas diffusion layer provided outside said catalyst layer, and said catalyst layer of at least one of said electrodes comprises two layers: a layer which is composed of conductive carbon carrying catalyst metal and a hydrogen ion-conductive polymer electrolyte and in contact with said polymer electrolyte membrane; and a layer which is composed of conductive carbon carrying no catalyst metal and a hydrogen ion-conductive polymer electrolyte, wherein the amount of the conductive carbon carrying no catalyst metal is equivalent to 20 to 30 wt % of the conductive carbon carrying the catalyst metal.

2. The polymer electrolyte fuel cell in accordance with claim 1, wherein said catalyst layer of each of said electrodes comprises two layers: a layer which is composed of the conductive carbon carrying the catalyst metal and the hydrogen ion-conductive polymer electrolyte and in contact with said polymer electrolyte membrane; and a layer which is composed of the conductive carbon carrying no catalyst metal and the hydrogen ion-conductive polymer electrolyte.

3. The polymer electrolyte fuel cell in accordance with claim 1, wherein he specific surface area of the conductive carbon carrying no catalyst metal in said catalyst layer is equal to or less than that of the conductive carbon carrying the catalyst metal.

4. The polymer electrolyte fuel cell in accordance with claim 1, wherein the content of the conductive carbon carrying the catalyst in the downstream side of the flow channel of the gas to be supplied to the electrode is larger than that in the upsteam side thereof.

5. A polymer electrolyte fuel cell comprising: a hydrogen ion-conductive polymer electrolyte membrane, a pair of electrodes sandwiching said electrolyte membrane therebetween and a pair of separator plates which respectively have a gas flow channel for supplying and discharging a fuel gas to and from one of said electrodes and a gas flow channel for supplying and discharging an oxidant gas to and from the other of said electrodes, wherein each of said pair of electrodes comprises: a catalyst layer in contact with said hydrogen ion-conductive polymer electrolyte membrane, said catalyst layer including a hydrogen ion-conductive polymer electrolyte and conductive carbon carrying a catalyst metal; and a gas diffusion layer provided outside said catalyst layer, and at least one of said pair of electrodes comprises: a water retention layer in contact with said catalyst layer, located between said catalyst layer and said gas diffusion layer, said water retention layer including a water-absorbent substance and conductive carbon carrying no catalyst metal; and a water-repellant layer located between said water retention layer and said gas diffusion layer, said water-repellant layer including conductive carbon and a water repellant agent.

6. The polymer electrolyte fuel cell in accordance with claim 5, wherein said water retention layer further includes a water-absorbent substance.

7. The polymer electrolyte fuel cell in accordance with claim 5, wherein said catalyst layer comprises a mixture in which the conductive carbon carrying the catalyst metal, the hydrogen ion-conductive polymer electrolyte and the conductive carbon carrying no catalyst metal are substantially homogeneously dispersed.

8. The polymer electrolyte fuel cell in accordance with claim 5, wherein the amount of the conductive carbon carrying no catalyst metal is equivalent to 10 to 20 w % of the conductive carbon carrying the catalyst metal.

9. The polymer electrolyte fuel cell in accordance with claim 5, wherein said water-absorbent substance is a hydrogen ion-conductive polymer electrolyte.

10. The polymer electrolyte fuel cell in accordance with claim 5, wherein the amount of the conductive carbon carrying no catalyst metal is equivalent to 20 to 30 w % of the conductive carbon carrying the catalyst metal.

11. The polymer electrolyte fuel cell in accordance with claim 5, wherein said pair of electrodes comprises: a water retention layer in contact with said catalyst layer, located between said catalyst layer and said gas diffusion layer, said water retention layer including a water-absorbent substance and conductive carbon carrying no catalyst metal; and a water-repellant layer located between said water retention layer and said gas diffusion layer, said water-repellant layer including conductive carbon and a water repellant agent.

12. The polymer electrolyte fuel cell in accordance with claim 11, wherein said water repellant agent is polytetrafluoroethylene.

13. The polymer electrolyte fuel cell in accordance with claim 5, wherein said catalyst metal is a platinum group metal.

14. The polymer electrolyte fuel cell in accordance with claim 5, wherein said water repellant agent is polytetrafluoroethylene.

15. The polymer electrolyte fuel cell in accordance with claim 5, wherein the specific surface area of the conductive carbon carrying no catalyst metal in said catalyst layer is equal to or less than that of the conductive carbon carrying the catalyst metal.

* * * * *

UNITED STATES PATENT AND TRADEMARK OFFICE
CERTIFICATE OF CORRECTION

PATENT NO. : 6,916,575 B2
DATED : July 12, 2005
INVENTOR(S) : Yoshihiro Hori et al.

It is certified that error appears in the above-identified patent and that said Letters Patent is hereby corrected as shown below:

<u>Title page,</u>
Item [75], Inventors, the third inventor's name should read -- Junji Niikura --;

<u>Column 16,</u>
Line 20, "later" should read -- layer --;
Line 41, "he" should read -- the --;

<u>Column 17,</u>
Line 16, "20 w %" should read -- 20 wt % --;
Line 23, "30 w %" should read -- 30 wt % --.

Signed and Sealed this

Fifteenth Day of November, 2005

JON W. DUDAS
*Director of the United States Patent and Trademark Office*